United States Patent [19]

Webber

[11] Patent Number: 5,539,894
[45] Date of Patent: Jul. 23, 1996

[54] METHOD AND APPARATUS FOR OPTIMIZING A SECTOR CACHE TAG, BLOCK AND SUB-BLOCK STRUCTURE BASE ON MAIN MEMORY SIZE

[75] Inventor: Thomas Webber, Cambridge, Mass.

[73] Assignee: Sun Microsystems, Inc., Mountain View, Calif.

[21] Appl. No.: 49,078

[22] Filed: Apr. 20, 1993

[51] Int. Cl.$^6$ ................................................. G06F 12/06
[52] U.S. Cl. .......................................... 395/455; 395/445
[58] Field of Search .................................. 395/425, 700, 395/445, 455

[56] References Cited

U.S. PATENT DOCUMENTS

| | | | |
|---|---|---|---|
| 4,493,026 | 1/1985 | Olnowich | 395/455 |
| 5,014,195 | 5/1991 | Farrell | 395/455 |
| 5,257,360 | 10/1993 | Schnizlein et al. | 395/455 |
| 5,301,296 | 4/1994 | Mohri et al. | 395/455 |
| 5,367,653 | 11/1994 | Coyle et al. | 395/455 |
| 5,414,828 | 5/1995 | Yarkoni | 395/445 |
| 5,465,342 | 11/1995 | Walsh | 395/446 |

*Primary Examiner*—Tod R. Swann
*Assistant Examiner*—David J. O'Neill
*Attorney, Agent, or Firm*—Blakely, Sokoloff, Taylor & Zafman

[57] ABSTRACT

A sector cache tag structure for a computer system with a cache memory and a maximum amount of system memory is disclosed. Upon initial power-up of the computer system, the amount of system memory installed in the computer system is determined. A minimum number of sub-blocks for the cache memory is selected such that when less than the maximum amount of system memory is installed, fewer sub-blocks are selected for each block in the cache memory. Based on the optimal number of sub-blocks selected for the amount of installed memory, a plurality of cache tags, block valid bits and sub-block valid bits are stored. The number of cache tags and block valid bits is equivalent to the number of blocks in the cache memory, and the number of sub-block valid bits is equal to the number of sub-blocks. The cache tags are stored in a cache tag random access memory (RAM). The block valid bits are stored in a block valid RAM which is large enough to store all the block valid bits for a minimum amount of memory installed in the computer system, and the sub-block valid bits are stored in a sub-block valid RAM comprising a total size to support the maximum amount of memory installed.

19 Claims, 11 Drawing Sheets max CAS RAM Configuration 430 min CAS RAM Configuration 420

METHOD AND APPARATUS FOR OPTIMIZING A SECTOR CACHE TAG, BLOCK AND SUB-BLOCK STRUCTURE BASE ON MAIN MEMORY SIZE

BACKGROUND OF THE INVENTION

1. Field of the Invention

The present invention relates to a cache memory in a computer system, and more specifically to an optimized cache tag structure associated with the amount of cache memory installed.

2. Art Background

Computer systems often utilize cache memory to store a subset of data contained in a larger main memory. The cache memory is implemented with high speed random access memories (RAMs) resulting in faster retrieval of data from the cache memory than from the system memory. However, system memory is generally not implemented entirely with the high speed memory because the high speed cache memory is more expensive than the larger main memory. Therefore, computer designers select a trade-off between the amount and the cost of the high speed cache memory.

Typically, in a cache memory system, a central processing unit (CPU), which requires data from system memory, first attempts to retrieve the data from cache memory. A cache tag structure is a mechanism that keeps track of the data that is present in the cache memory. Each piece of data present in the cache memory has an address tag which uniquely identifies the data. The cache tag typically has several fields stored in RAM's: the address tag, a block valid bit and sub-block valid bit, if sub-blocks are used. When the CPU attempts to access data in the cache memory, a portion of the address location of the data in main memory known as cache tags are compared with a portion of the main memory address of the data. The cache tags are compared by presenting main memory addresses to a RAM storing the cache tags. Normally, a valid bit is used in conjunction with the cache tags. If the cache tag matches the memory address and the valid bit is set, then the tag check operation is termed a "hit" and the piece of data in the location corresponding to the tag is sent to the CPU; otherwise it is a "miss" and the main memory supplies the data.

The entire main memory address, however, need not be stored as cache tags. Often, in order to minimize storage requirements, attempts to reduce the number of address tag bits are desirable. For example, it is redundant to store part of the address known as the "word component selector" as part of the address tag. These bits select both a block from the cache memory, and a tag from the cache tag structure. If the word component selector performs a one-to-one mapping function, it redundant to use these bits in the comparison operation. Therefore, the word component selector bits do not need to be stored as part of the tag.

In addition to storing cacheable data in blocks, grouping of consecutive pieces of cacheable data, called "sub-blocks", into blocks that share the same tag is also employed. The use of sub-blocks to store cache tags in the cache tag structure is a common technique for reducing cache tag storage requirements. A sub-block contains the smallest piece of data that can be brought into the cache. Typically, the number of sub-blocks that are grouped into blocks is constant, but the number of sub-blocks present within a block at any given time may vary. A field of bits, called "sub-block valid bits", tracks which sub-blocks of the block are valid. Typically, the number of sub-blocks within a block is fixed and does not vary.

When retrieval of data by the CPU results in a cache "miss", a replacement operation is performed in that data from the main memory is placed in the cache memory. Normally, in set associative caching, the cache memory is organized so as to map several main memory locations into one cache memory location. During the replacement operation, a new sub-block is retrieved from system memory and is stored in the cache memory. The address tags are also updated during a replacement operation. Whenever a block is replaced, one sub-block is marked valid and all other sub-blocks in the block are marked "not valid". Because the old address tag is lost, the replacement operation displaces all the valid sub-blocks of the previous block at that cache location with only one new sub-block.

Since the replacement operation tends to replace many old sub-blocks with one new sub-block, system performance suffers because replacement "pollutes" the cache. The replacement operation may adversely affect performance because by invalidating sub-blocks used recently by the processor, the likely-to-be-used data becomes polluted with the unlikely-to-be-used data. Cache strategies that use fewer sub-blocks are less prone to "pollution" during replacement. Because there is less sharing of tags by sub-blocks, fewer sub-blocks are marked invalid during replacement. This tradeoff between the economy of sub-block shared tags and system performance degradation from cache pollution is usually optimized and fixed for a system design.

SUMMARY OF THE INVENTION

A method and apparatus for optimizing a cache tag structure for a computer system with a cache memory is disclosed. The computer system comprises a central processing unit (CPU), a maximum system memory size, and a predetermined cache memory size. The cache memory is arranged in a plurality of blocks wherein each block contains a plurality of sub-blocks. Upon initial power-up of the computer system, the amount of system memory installed in the computer system is determined. A minimum number of sub-blocks for the cache memory is selected such that when less than the maximum amount of system memory is installed, fewer sub-blocks are selected for each block in the cache memory. The minimum number of sub-blocks selected ranges as a power of two from at least two sub-blocks to a maximum number of sub-blocks required to cache the maximum amount of memory. Minimizing the number of sub-blocks for each block results in reducing the cache "pollution" problem associated with a replacement operation. From the selection of the optimized number of sub-blocks, the number of blocks is determined.

Based on the optimal number of sub-blocks selected for the amount of installed memory, a plurality of cache tags, block valid bits and sub-block valid bits are stored. The number of cache tags and block valid bits is equivalent to the number of blocks in the cache memory, and the number of sub-block valid bits is equal to the number of sub-blocks. In a preferred embodiment of the present invention, the address tags are stored in a cache tag random access memory (RAM). The block valid bits are stored in a block valid RAM which is large enough to store all the block valid bits for a minimum amount of memory installed in the computer system. The sub-block valid bits are stored in a sub-block valid RAM comprising a total size to support the maximum amount of memory installed.

Upon retrieval of data from memory by the CPU, an address tag, provided from the address tag RAM, is compared to a comparison portion of the address to determine whether the data is located in the cache memory. In addition, a block valid bit corresponding to the address tag is retrieved from a block valid RAM, and a sub-block valid bit corresponding to the sub-block selected is also retrieved. If the address tag matches and the block and sub-block valid bits are valid, then a cache hit occurs. The present invention also provides a method and apparatus for replacing data entries in the cache memory on an occurrence of a cache miss.

BRIEF DESCRIPTION OF THE DRAWINGS

The objects, features and advantages of the present invention will be more fully described in the following detailed description, wherein.

NOTATION AND NOMENCLATURE

Figure 1:
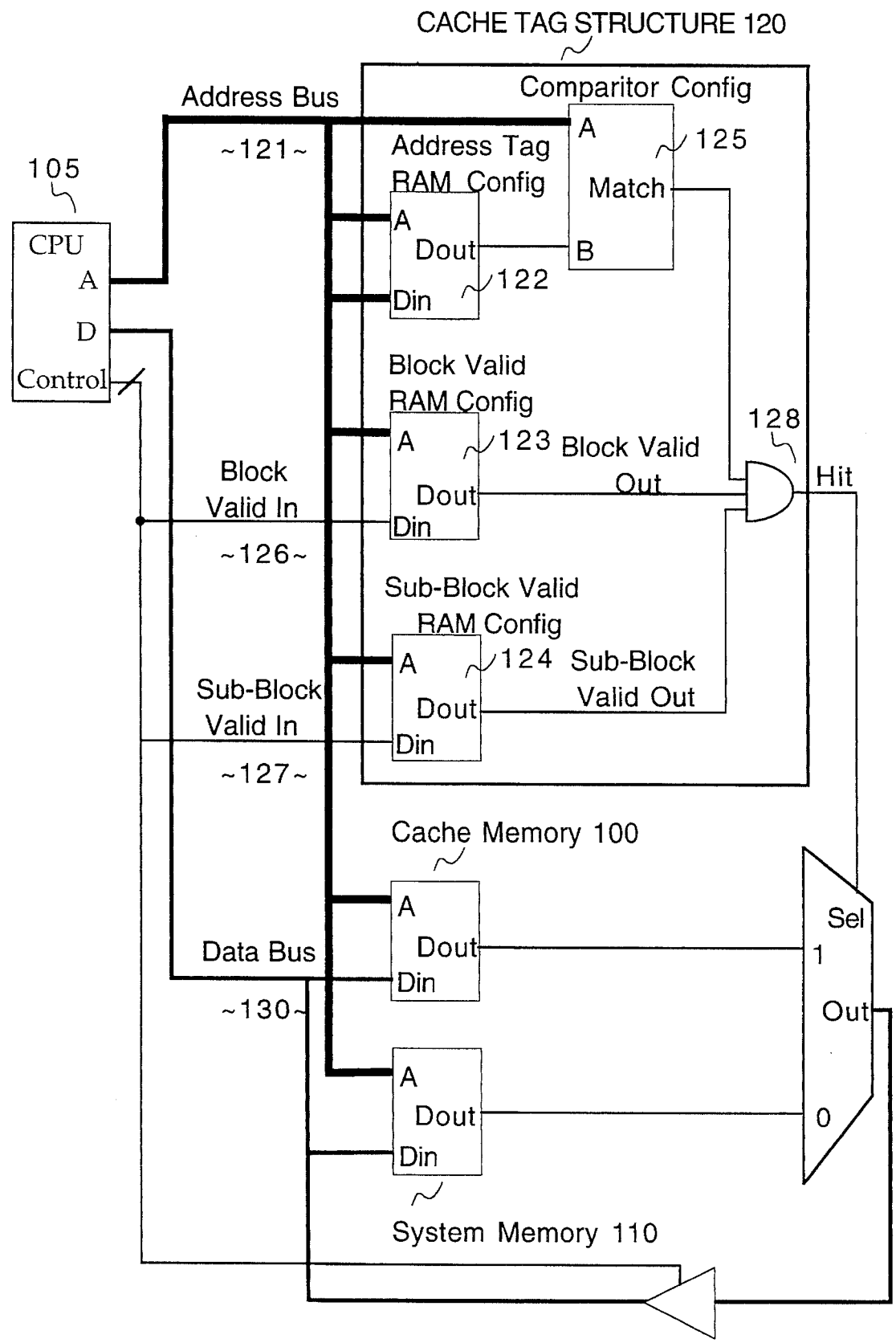
FIG. 1 is a high level block diagram of a cache memory configuration of a computer system incorporating the teachings of the present invention.

The detailed descriptions which follow are presented largely in terms of algorithms and symbolic representations of operations within a computer system. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases there should be borne in mind the distinction between the method operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below.

Coding Details

No particular programming language has been indicated for carrying out the various procedures described herein. This is in part due to the fact that not all languages that might be mentioned are universally available. Each user of a particular computer will be aware of a language which is most suitable for his immediate purposes. In practice, it has proven useful to substantially implement the present invention in an assembly language which provides a machine executable object code. Because the computers and the monitor systems which may be used in practicing the instant invention consist of many diverse elements, no detailed program listing has been provided. It is considered that the operations and other procedures described herein and illustrated in the accompanying drawings are sufficiently disclosed to permit one of ordinary skill to practice the instant invention.

DETAILED DESCRIPTION OF THE INVENTION

A method and apparatus for optimizing the cache tag structure in a computer system according to the amount of system memory installed is disclosed. In the following description for purposes of explanation, specific memories, organizations, and architectures, etc. are set forth in order to provide a thorough understanding of the present invention. However, it will be apparent to one skilled in the art that the present invention may be practiced without these specific details. In other instances, well-known circuits are shown in block diagram form in order not to obscure the present invention unnecessarily.

Referring to FIG. 1, a memory configuration incorporating the cache tag structure of the present invention is illustrated. The memory configuration comprises cache memory 100 and system memory 110 coupled to an address bus 121 and data bus 130. A cache tag structure 120 comprises an address tag RAM config 122, a comparator config 125, a block valid config RAM 123 and a sub-block valid RAM config 124. The comparator config 125, block valid RAM config 123 and sub-block valid RAM config generate outputs for input to an AND gate 128. The AND gate 128 indicates a cache "hit" when all three of the inputs to AND gate 128 indicate the appropriate conditions are present. First, the address tag, indexed by the word component selector, must match the address bits (called the "comparison range") used in the comparison operation. In the cache tag structure 120, comparator config 125 performs a comparison operation between a range of the addresses, referred to as the "comparison range", and the address tag. Typically, the comparison range starts with the next highest order bit that exceeds the word component selector.

In a cache tag structure 120, comparator config 125 generates a match indication whenever the address tag matches the comparison range of the address bits. A match indicates that data referenced by the address bits is located within the cache memory 100. As a second condition for a cache "hit", block valid out generated from block valid RAM config 123 must indicate that the block associated with the address is valid. A block valid bit 126 is set for each block upon initial placement of data into the cache memory 100. In the cache tag structure 120, one bit indicates the validity of a single cache block in cache memory 100. The block valid bit 126 is used in conjunction with other signals to determine if the data referenced by the address is in the cache.

In the cache tag organization of the present invention, the cache blocks of cache memory 100 are divided into sub-blocks. A sub-block valid RAM config 124 comprises a plurality of sub-block valid bits such that each sub-block in cache memory 100 has a corresponding sub-block valid bit in sub-block valid RAM config 124. When the sub-blocks of cache memory 100 are individually filled from system memory 110, a sub-block valid in bit 127 is set for the corresponding sub-block valid bit to indicate the sub-block is valid. As a third condition for a cache hit, a sub-block valid out bit must indicate that the sub-block selected by the address on address bus 121 is valid. When a sub-block within a block is replaced or updated in cache memory 100, the corresponding sub-block valid bit is set to indicate that the sub-block is valid. If the corresponding block in which the sub-block resides is being replaced, then the remaining sub-block valid bits in the block are set to indicate that the data is invalid. If a block is being updated such that a new sub-block is being added the block, then only the corresponding sub-block valid bit for the updated sub-block is modified.

For purposes of explanation, cacheable address space (CAS) is defined as a non-fragmented set of addressable locations that are cacheable. Although the CAS is not limited only to memory, typically, the CAS is configured to accommodate the maximum amount of system memory the computer system architecture supports. When the computer system is configured to accommodate the maximum amount of system memory, the computer system configuration is defined as the maximum cacheable address space (Max CAS) configuration. The Max CAS configuration is defined as a computer system configured with the maximum amount of memory the computer system architecture supports. An intermediate cacheable address space (Intermediate CAS) configuration is defined as a computer system configured with less than the maximum amount of installed memory. As one skilled in the art will appreciate, a computer system incorporating the teachings of the present invention may comprise a plurality of intermediate CAS configurations limited only by the number of possible sub-block configurations. The minimum cacheable address space (Min CAS) configuration is defined as a computer system configured with the least amount of installed memory. For example, a computer system configuration that supports from 8 to 256 Mbytes of system memory, Min CAS might be 16 Mbytes, intermediate CAS 32, 64, 128 MBytes, and Max CAS 256 MBytes.

Typically, computer system cache tag structures are configured to support the maximum amount of system memory. However, computer systems are often installed with less than the maximum amount of system memory. If the computer system contains less than the maximum amount of memory, upper address tag bits used to access an upper boundary portion of the maximum memory are unused because the address bits reference nonexistent memory locations. The present invention optimally utilizes the address tag bits when the minimum and intermediate CAS configurations are present so as to utilize the entire address tag RAM. A balance is struck once a particular computer system boots up whereby, depending on the amount of installed memory, larger tags may be replaced by more tags of smaller size. By increasing the number of address tags employed, the number of sub-blocks that need to be specified by each tag is reduced.

As is described more fully below, the optimization of the cache structure of the present invention is flexible. For system configurations that use Max CAS, an address tag RAM is configured wide but not deep, and the number of sub-blocks is maximized accordingly. For Min CAS configurations, address tag bits ordinarily representing upper address bits for accessing high order memory are reconfigured to provide an address tag RAM that is narrow and deep. The Min CAS configuration results in a decrease in the number of sub-blocks. Similarly, intermediate CAS configurations balance the address tag structure and the number of sub-blocks according to the amount of system memory installed. The present invention describes a method and apparatus for optimizing a cache tag structure for different CAS configurations of a particular computer system based on the amount of memory that is installed.

For a computer system with a maximum system memory size of Max CAS and a cache memory size of Cache Size, the cache tag structure for a given cache addressable space having addressable locations in the amount of CASSize is optimized as follows. It should be appreciated by those skilled in the art that the extent of system memory installation has a direct impact on CASSize and the number of sub-blocks ("NumberSubBlocks") within each cache block.

The structure of an optimized address tag RAM portion of the cache tag structure can be expressed by:

$$Td * Tw = Tp \quad \text{(Equation 1)}$$

with:

$$Td = f(\text{Cache Size}, \text{NumberSubBlocks}) \quad \text{(Equation 2)}$$

$$Tw = \log_2(f(\text{CASSize}, \text{CacheSize})) \quad \text{(Equation 3)},$$

where:
Td: Number of tags that the address tag RAM can store.
Tw: Number of bits in an address tag.
Tp: Total number of bits in the address tag RAM.

Figure 2:
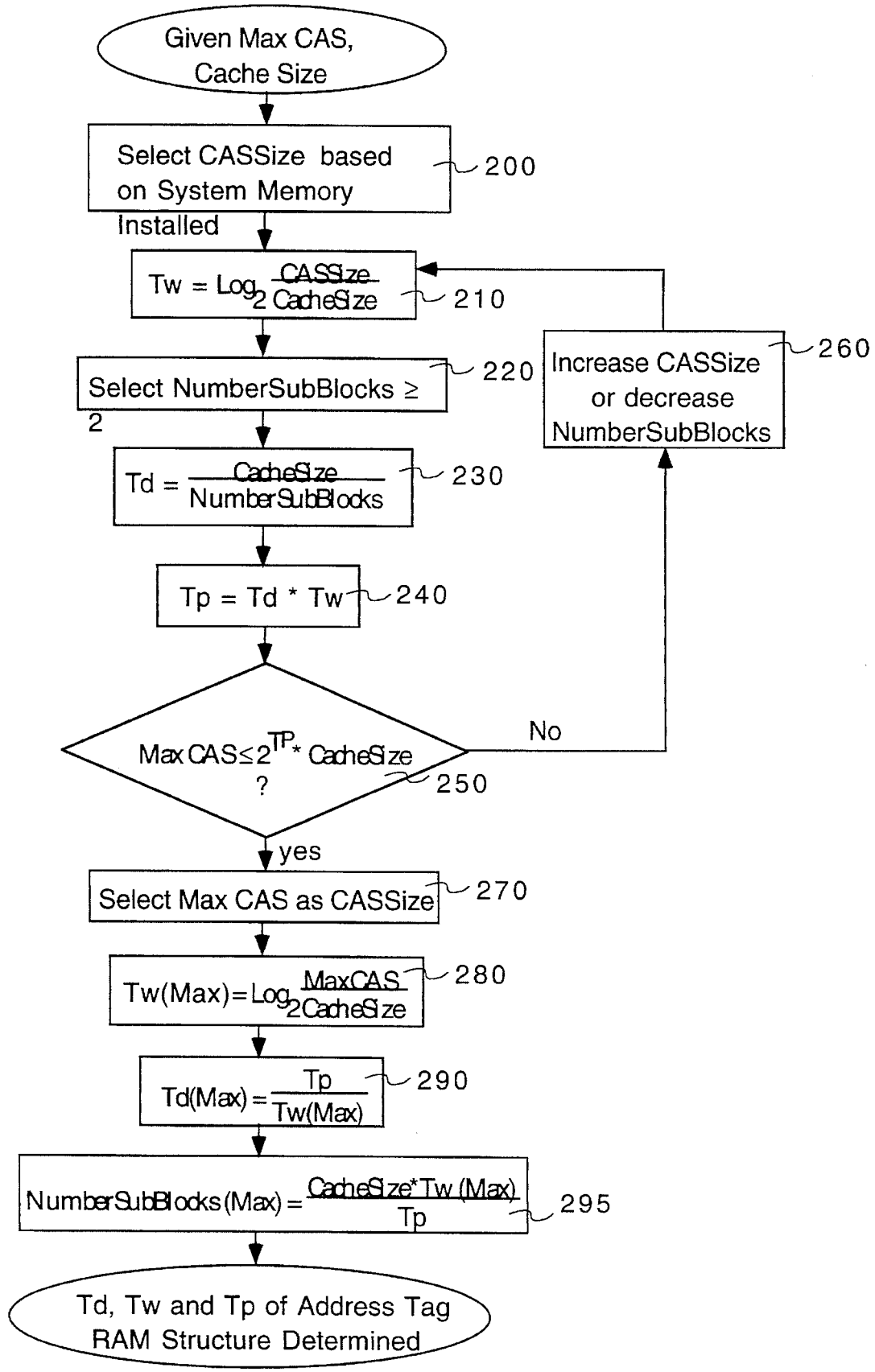
FIG. 2 is a flow chart illustrating the present invention method of optimizing a cache tag structure.

Referring to FIG. 2, a flow diagram illustrating the method of optimization for the address tag RAM is shown. For a given extent of system memory installation, a CASSize is first selected by the optimization method and apparatus of the present invention 200. A Tw is then calculated 210 according to Equation 3. A NumberSubBlocks is also selected by the optimization method and apparatus of the present invention 220. A Td is thus determined 230 according to Equation 2. With Td and Tw determined, the dimension Tp=Td*Tw can be calculated 240 according to Equation 1. The optimization method and apparatus of the present invention then checks the Tp value to ensure the condition that Max CAS$\leq 2^{Tp}$*CacheSize is satisfied 250. If the condition is not satisfied, then CASSize is increased or NumberSubBlocks is decreased 260 until the condition is satisfied, i.e. Max CAS is accommodated by the address tag RAM structure defined by Tw*Td. It should be apparent to those skilled in the art that the selection of CASSize affects the degree of the optimization only. There is no penalty for an "incorrect" CASSize selection other than below-optimal performance.

After the address tag RAM structure for a given system memory installation is defined by Tp=Tw*Td, the optimal number of sub-blocks contained in each cache block for the maximum CAS is determined. Given CacheSize, Tp from the already-defined address tag RAM structure, and the maximum amount of cacheable address space ("Max CAS") as CASSize, Equations 1–3 lead to Td(Max) and Tw(Max) 280, 290.

$$Td(\text{Max}) * Tw(\text{Max}) = Tp$$

With Tp and Tw(Max) determined, the number of sub-blocks used for the Max CAS case is:

$$\text{NumberSubBlocks} = f(\text{CacheSize} * Tw(\text{Max}), Tp)$$

The determination of the address tag RAM structure for any CASSize should now be apparent to those skilled in the art. An optimized address tag structure for a given CASSize can be determined using Equations 1–3. Each CAS will result in an unique Td, Tw, and CASSize that is determined by NumberSubBlocks. As will be appreciated by those skilled in the art, the possible NumberSubBlocks values range as a power of two from NumberSubBlocks(Minimum CAS), which has a minimum value of 2, to NumberSubBlocks (Max CAS).

After the determination of the optimized address tag RAM configuration 122 of FIG. 1, the optimization method and apparatus of the present invention further provides for an optimized comparator 125 whereby the number of bits used in the comparison operation varies according to the cache tag structure. Similar to the operation of a conventional cache tag structure, the comparator 125 is comparing the comparison range with the address tag and generating a match output, if matching occurs. However, the number of bits in the comparison operation varies with Tw, which varies according to the cache tag structure (i.e. the number of sub-blocks selected). The comparison range begins with a LSB of the address that exceeds the range required to address the memory installed, and extents to the number of bits as dictated by Tw.

The optimization method and apparatus of the present invention determines the comparator configuration 125 as follows:

Comparison range={$Tw$+LSB(meta cache range):LSB(meta cache range)}, where:
Comparison range—The range of address bits used in the comparison operation with the address tags.
Cache range—The address bits that index the cache.
Meta cache range—The higher-order address bits that exceed the amount required to address the installed memory.

In addition to the address tag RAM configuration 122 and comparator config 125, each cache tag structure 120 has unique requirements for the total number of block valid bit structure 123 according to the value Td. Therefore, the cache tag structure 120 comprises enough block valid bits 123 to accommodate the cache tag structure for the minimum amount of memory installed for the computer system. Thus, the total number of block valid bits required for the cache tag structure according to the determination of the optimization method and apparatus of the present invention is equal to Td(Min). The valid bit RAM 123 configuration (Vp) is expressed as Vd*Vw=Vp. Vd, equal to the Td associated with the cache tag structure with the Min CAS condition, is thus equal Td(Min). Vw is a one-bit field in the cache tag and is thus equal to 1.

The optimization method and apparatus of the present invention determines the optimized number of sub-blocks for the amount of memory installed. The number of sub-blocks associated with a cache block varies as a power of two. Typically, the cache tag structure with the Min CAS condition is assigned two sub-blocks. Other cache tag structures use increasingly larger numbers of subblocks up to the cache tag structure with the Max CAS condition. According to the optimization method and apparatus of the present invention, the implementation of the sub-block valid RAM 124 has to account for the changing number of sub-blick valid (SBV) bits associated with a cache block across the cache tag structures (120). SBV bits from the same cache block are organized into SBV groups. Each SBV group is associated with a block and a valid bit. The SBV RAM configuration (Sp) is expressed as Sd*Sw=Sp. The number of sub-block valid bits (Sd) is determined from any tag structure as Sd=Td*NumberSubBlocks. Sw is thus equal to 1. From the above equations, it can be seen that the number of bits in a SBV RAM 124 is constant across all cache tag structures.

For purposes of explanation, an example of a computer system memory arrangement incorporating the teachings of the present invention is provided. Although the following example is provided on a scaled down version, one skilled in the art will appreciate that the example could be extended to larger cache and system memory arrangements. For the following example, the computer system comprises: system architecture which supports up to 256 bytes of installed memory; a 16 byte direct mapped cache memory; and a minimum requirement of 32 bytes of installed memory. For this example, the Max CAS configuration is optimized to support 256 bytes of memory, and the Min CAS configuration is optimized to support 32 bytes of memory. Although the following hardware configuration is described in conjunction with Max and Min CAS configurations, it will be appreciated that any number of intermediate CAS configurations, conforming to the above limitations, could be implemented.

First, the tag structure for the minimum CAS is determined, upon choosing a CASSize of 32 bytes and NumberSubBlocks of 2:

$Tw(Min) = \log_2 (CASSize) - \log_2 (CacheSize)$ $Tw(Min) = \log_2 (32) - \log_2 (16) = 1$ $Td(Min) = f(CacheSize, NumberSubBlocks) = f(16,2)$ $Tp = Td(Min) * Tw(Min) = 8 \times 1 = 8$ To be able to accommodate a Max CAS condition, the expression $MaxCAS \leq (2^T P * CacheSize)$ is checked and is satisfied by virtue of $256 \leq 2^8 \times 16 = 256 \times 16 = 4096$. Therefore the cache tag structure with a Min CAS condition is to be configured by the optimization method and apparatus of the present invention as 8 by 1. Therefore the Max CAS is accommodated. Otherwise a larger Min CAS will be selected or the number of sub-blocks increased.

Second, the address tag RAM structure for the Max CAS is configured according to the following:

$Tw(Max) = \log_2 (CASSize) - \log_2 (CacheSize)$ $Tw(Max) = \log_2 (256) - \log_2 (16) = 8 - 4 = 4$ $Tp = Td(Max) * Tw(Max)$ $Td(Max) = f(Tp, Tw(Max))$ $Td(Max) = f(8,4) = 2$ Therefore the tag structure for the Max CAS should be configured to be 2 by 4 for optimal performance. Also, the number of sub-blocks for a Max CAS is expressed as NumberSubBlocks(Max)=f(CacheSize*Tw(Max),Tp) and NumberSubBlocks (Max)=f(16×4,8)=8. Therefore, for a maximum CAS condition, 8 sub-blocks are required to achieve optimal performance.

With respect to configuring the comparator for the present example, the comparator generates a match signal whenever a positive comparison is detected between the relevant memory address bits and the address tag RAM output. The LSB of the meta cache range is A[4] since A[3:0] are used to index the 16-byte cache. Tw(Min) is 1, fixing the comparison range for the Min CAS to A[4]. Tw(Max) is 4, fixing the comparison range for the Max CAS to A[4:7]. The comparison operation will be designed to be flexible to use A[4:7] and all four address tag RAM outputs or A[4] and a single address tag RAM output as a function of the CAS configuration.

With respect to configuring the block valid RAM for the present example, since Td(Min) is 8, the block valid RAM is to be configured as 8 by 1 to achieve optimal performance. With respect to configuring the sub-block valid RAM with a Max CAS condition, Td(Max) is 2 and the number of sub-blocks is 8. Since Sd=Td*NumberSubBlocks, Sd=2×8=16. And Sw=1. Therefore the sub-block valid RAM is configured as 16 by 1 to achieve optimal performance.

Figure 3A:
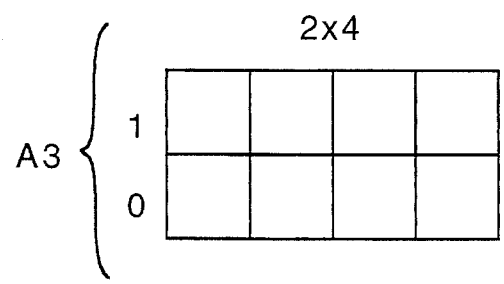
FIG. 3a is a block diagram illustrating an example of a random access memory (RAM) for a maximum cacheable address space (Max CAS) configuration in a computer system incorporating the teachings of the present invention.

In the preferred embodiment of the present invention, a word select component and a pointer component are designated for operation of the cache tag structure. For the present example, the word select and pointer components of the address are specified at bit locations A3 and A2:1 respectively. The operation of the word select and pointer components of the address are described more fully below. In the present invention, the address tag RAM is configured to accommodate the Max CAS configuration. As indicated by the above equations, the Max CAS configuration, having 256 bytes of addressable memory, comprises a 2×4 RAM array. Therefore, for the Max CAS configuration 430, there are 2 address tags comprising 4 bits of data for each tag. The Max CAS configuration for the present example is illustrated in FIG. 3a.

Figure 3B:
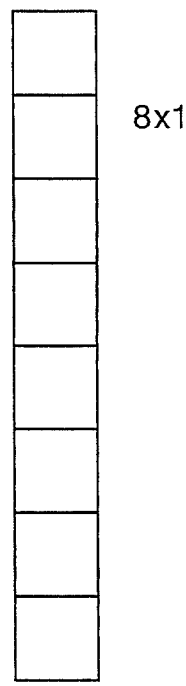
FIG. 3b is a block diagram illustrating an example of a random access memory (RAM) for a minimum cacheable address space (Min CAS) configuration in a computer system incorporating the teachings of the present invention.

The address tag RAM configuration for the Min CAS configured is also derived from the above equations. For the Min CAS configuration 420, having 32 bytes of addressable memory, there are 8 address tags 1 bit in length each address tag. The Min CAS configuration 420 for the present example is illustrated in FIG. 3b. For purposes of explanation only, the address tag RAMs for the Max and Min CAS configurations of FIGS. 3a–b respectively are shown as different configurations. However, in a preferred embodiment of the present invention, the same address tag RAM is used for all CAS configurations. In the present example, the address tag RAM is physically configured for the Max CAS configuration. The Min CAS RAM configuration illustrated in FIG. 3b illustrates the "logic" arrangement of the address tag RAM configuration for the present example.

Figure 3C:
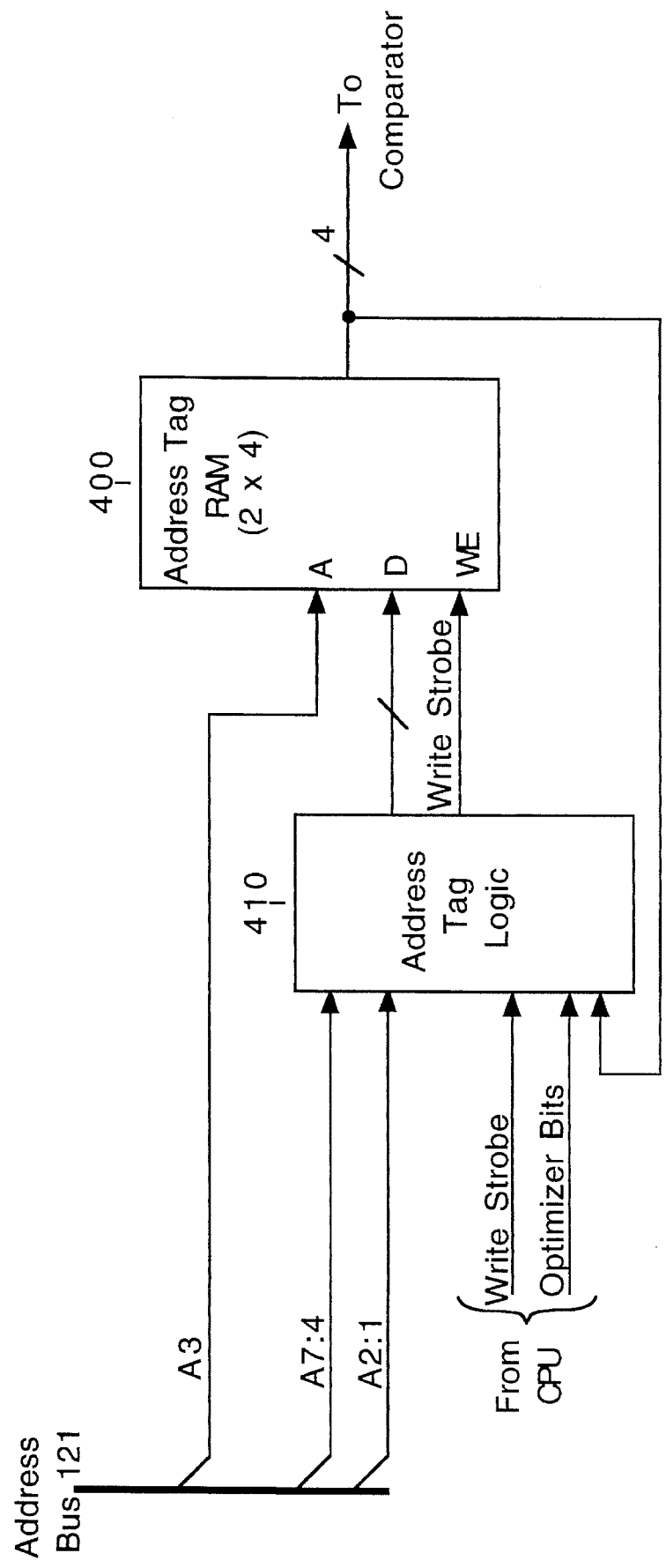
FIG. 3c is a block diagram illustrating an example of an address tag RAM configuration incorporating the teachings of the present invention.

Referring to FIGS. 3c, an address tag RAM configuration incorporating the teachings of the present invention is illustrated. The address tag RAM configuration comprises address tag logic 410 and an address tag RAM 400. The A3 address bit comprises the select word component of the physical address, and is coupled to the address port of Address Tag RAM 400. To determine whether a cache hit occurs, the appropriate address tag is retrieved from the RAM for comparison with a portion of the physical address. The appropriate address tag is read from address Tag RAM 400 at address location A3 in both the Max CAS and Min CAS configurations. If the result of the comparison is a miss, then a replacement operation occurs. In order to perform replacement operations across all CAS configurations, the address tag is written as a function of the following. A write strobe and optimizer bits, from the CPU, are provided to the Address Tag Logic 410. The output port of Address Tag RAM 400 is coupled to an input of the Address Tag Logic 410. The Address Tag Logic receives both the comparison component (A7:4) and pointer component (A2:1) of the address. The replacement operation used to update the address tag RAM is explained more fully below.

Figure 4:
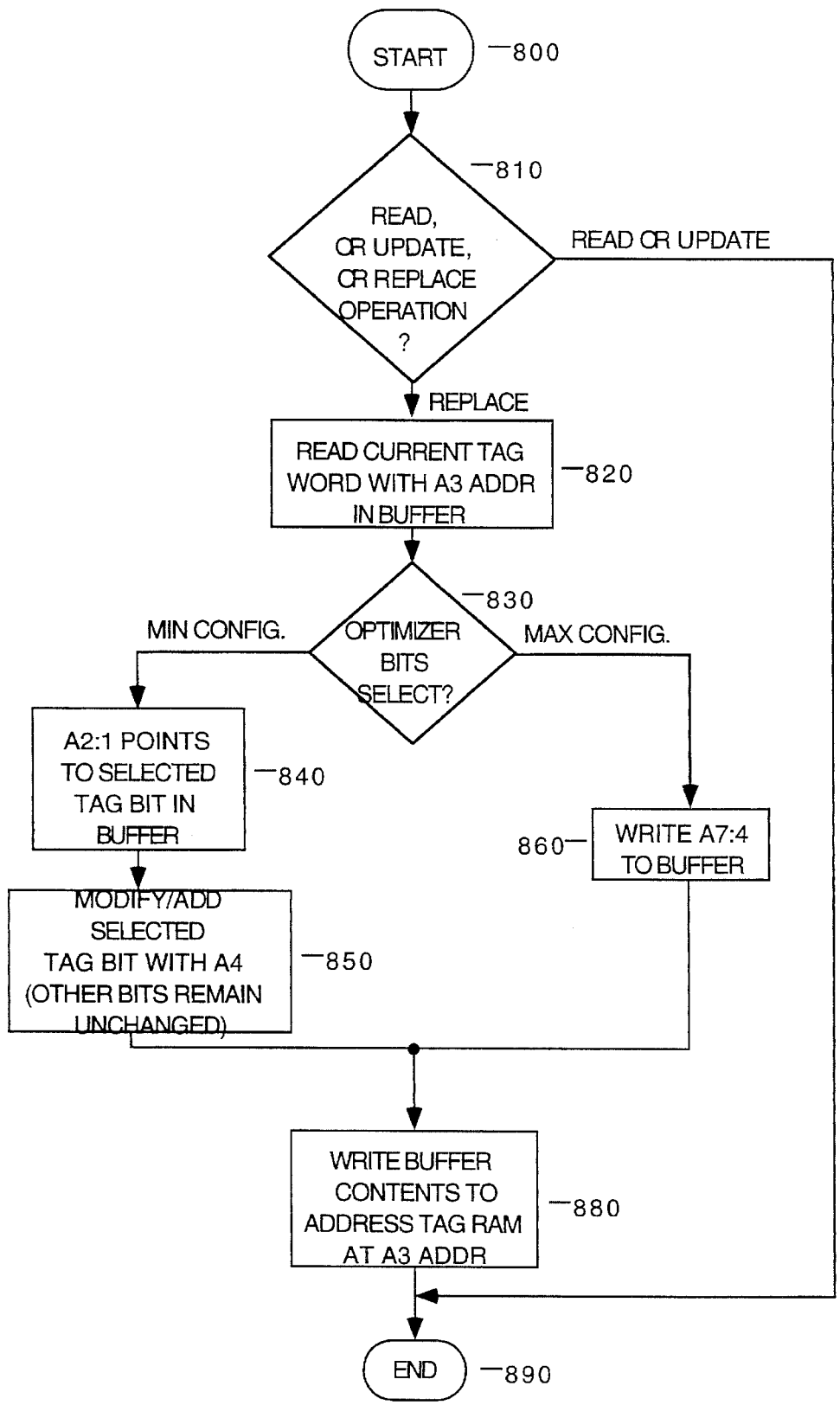
FIG. 4 is a flow diagram illustrating the method of address tag logic incorporating the teachings of the present invention.

Referring to FIG. 4, a flow diagram illustrating the method of address tag logic incorporating the teachings of the present invention is shown. The address tag logic 410 first determines whether access to the address tag RAM 400 is in conjunction with a read, replacement or update operation. If the access is for a replacement or update operation, as indicated by the write strobe, then an address tag word is read with the word select component of the address. Then, the optimizer bits are read for indication of the cache structure selected. If the Max CAS configuration is selected, then the full comparison component of the address is used to write the replacement address tag to the buffer in address tag logic 410. If a configuration comprising less than the maximum amount of memory is indicated, such as the minimum CAS configuration, then the pointer component of the address indexes the address tag within the address tag word selected. The appropriate portion of the comparison component of the address updates the address tag within the address tag word. The address tag word is then written to the address tag RAM 400 and the replacement or update operation is completed.

Figure 5:
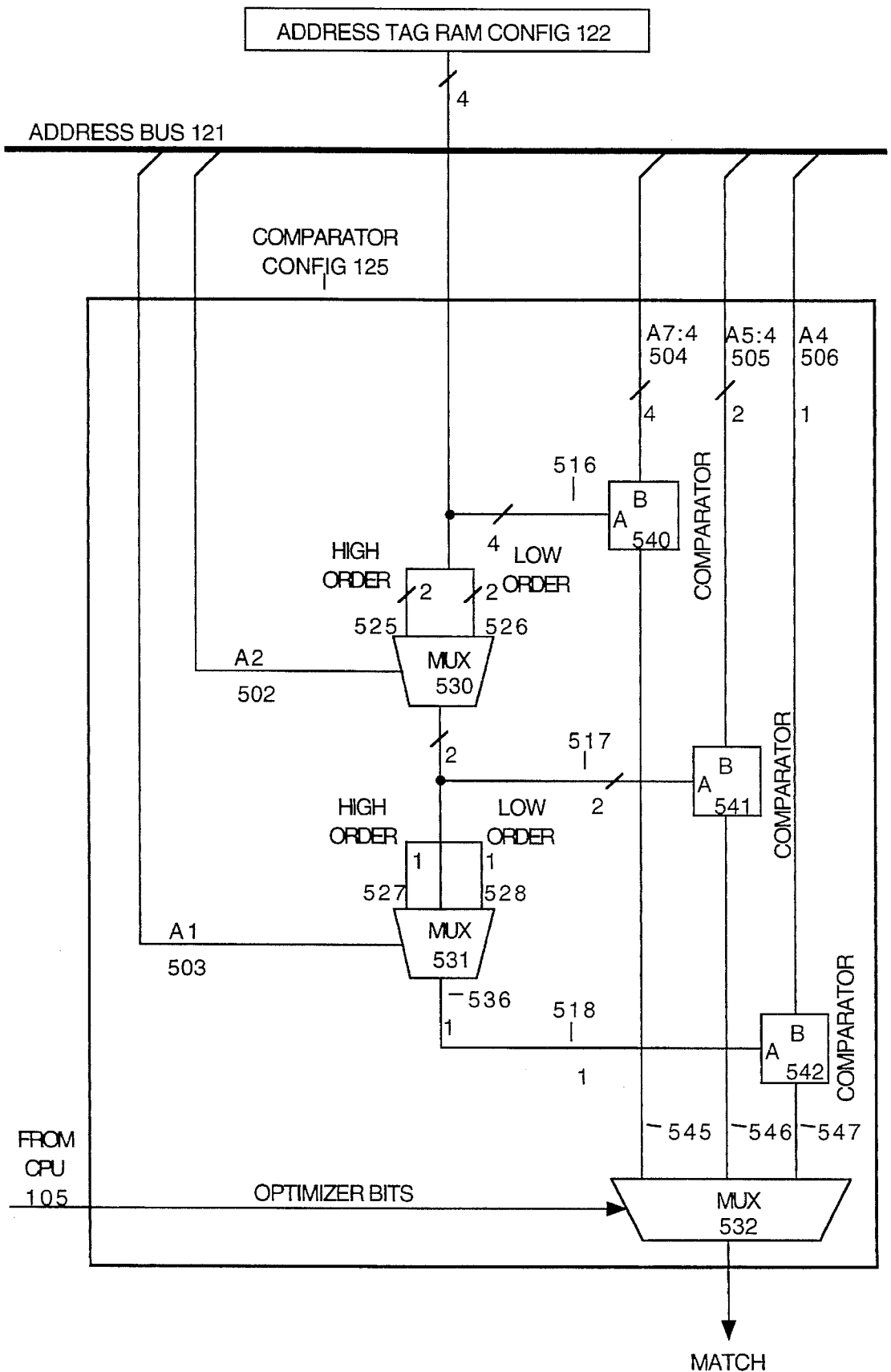
FIG. 5 is a block diagram illustrating an example of a comparator configuration incorporating the teachings of the present invention.

Referring to FIG. 5, a block diagram illustrating an example of a comparator configuration incorporating the teachings of the present invention is shown. The address bus 121 and the output address tag from the Address Tag RAM Configuration 122 is coupled to comparator configuration 125. The comparator configuration 125 generates a match signal as an output. For the present example incorporating selection for a Max and Min CAS configurations, the comparator configuration 125 comprises multiplexors (MUX) 530–531, and comparators 540–542. When determining whether a cache hit condition exists, the address from the CPU is placed on address bus 121. All four bits (A7:4) of the comparison component of the address comprise a first input to comparator 540. The four bits selected from address tag RAM configuration comprise a second input to comparator 540. If the selected address tag and the (A7:4) comparison component of the address matches, a match signal 545 is provided to a MUX 532.

The selected 4 bit address tag from address tag RAM configuration 122 is divided into a high order address tag 525 and a low order address tag 526, each of the address tags comprising 2 bits, and are input to MUX 530. Address bit A2 selects between the high order address tag 525 and the low order address tag 526, and the two bit address tag output is coupled to a first input to comparator 541. A second input to comparator 541 comprises address bits (A5:4). If the two bit address tag selected and the (A5:4) comparison component of the address matches, a match signal 546 is provided to the MUX 532. The selected 2 bit address tag from MUX 530 is divided into a high order address tag 527 and a low order address tag 528, each of the address tags comprising 1 bit, and are input to MUX 531. Address bit A1 selects between the high order address tag 527 and the low order address tag 528, and the one bit address tag output is coupled to a first input to comparator 542. A second input to comparator 542 comprises address bit (A4). If the one bit address tag selected and the (A4) comparison component of the address matches, a match signal 547 is provided to the MUX 532. In the present example, the comparison performed with comparator 540 designates the Max CAS configuration. The comparisons performed in comparator 541 and 542 are made in accordance with the intermediate and minimum CAS configurations respectively. The optimizer bits, from CPU 105, select the proper CAS configuration at MUX 532. In this way, one of the match signals 545, 546 or 547 is selected to indicate an address tag match with the address for the appropriate configuration.

Figure 6:
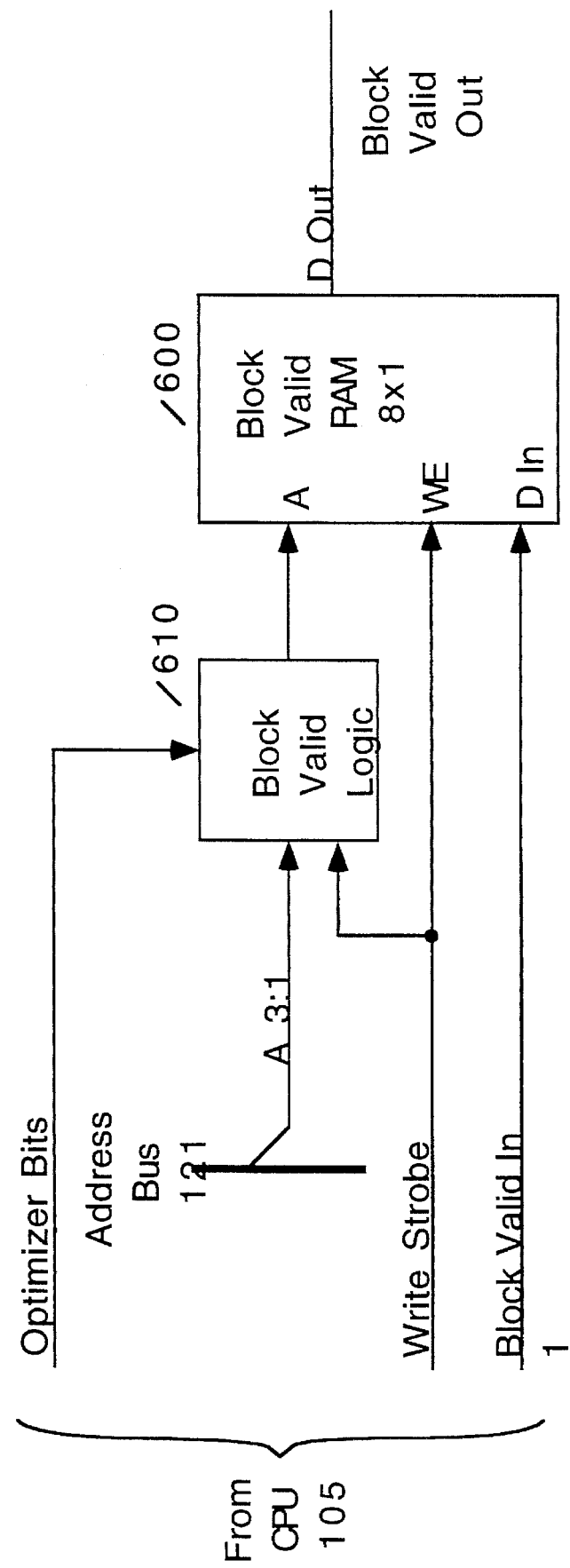
FIG. 6 is a block diagram illustrating an example of a block valid RAM configuration incorporating the teachings of the present invention.

Referring to FIG. 6, a block diagram illustrating an example of a block valid RAM configuration incorporating the teachings of the present invention is shown. The block valid RAM configuration 123 comprises block valid logic 610 and block valid RAM 600. For the present example, the block valid RAM 600 is configured in accordance with the Min CAS configuration as explained above. The Block Valid Logic 610 receives the optimizer bits and address bits A3:1 as inputs, and in turn, provides an address for Block Valid RAM 600. A Block Valid In bit is input to the data port of the Block Valid RAM 600.

Figure 7:
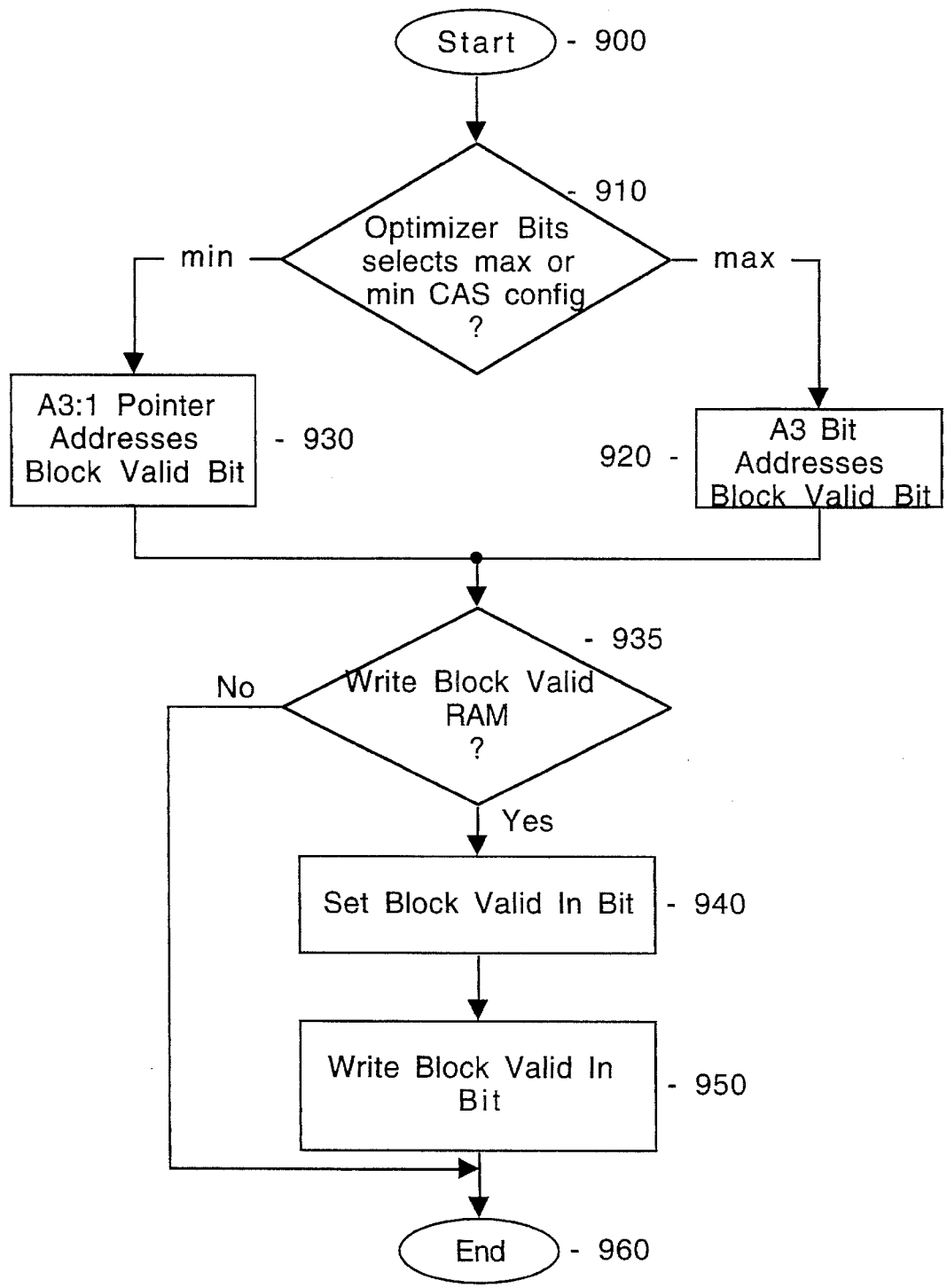
FIG. 7 is a flow diagram illustrating the method of block valid logic incorporating the teachings of the present invention.

Referring to FIG. 7, a flow diagram illustrating the method of block valid logic incorporating the teachings of the present invention is shown. The implementation of the Block Valid RAM configuration 123 in the present invention utilizes the same RAM for all tag structures. This causes an aliasing problem for tag structures not implementing the Min CAS configuration. The solution is to map all references to unused Block Valid RAM locations to the appropriate location as provided in block valid logic 610. The optimizers bits are first read to determine the configuration selected. In the present example, if a Max CAS is selected, then the word select component (A3) selects the block valid bit from block valid RAM 600. If the Min CAS is selected, then both the pointer components and the word select components (A3:1) select the appropriate block valid bit. The block valid logic 610 then determines whether the operation is a read or write operation as indicated by the write strobe. If the operation is a write such as a block replacement operation, then the block valid bit, set by CPU 105, is written to block valid RAM 600. For a hardware implementation of block valid logic 610, several well-known techniques such as index manipulation or data masking can be used.

Figure 8:
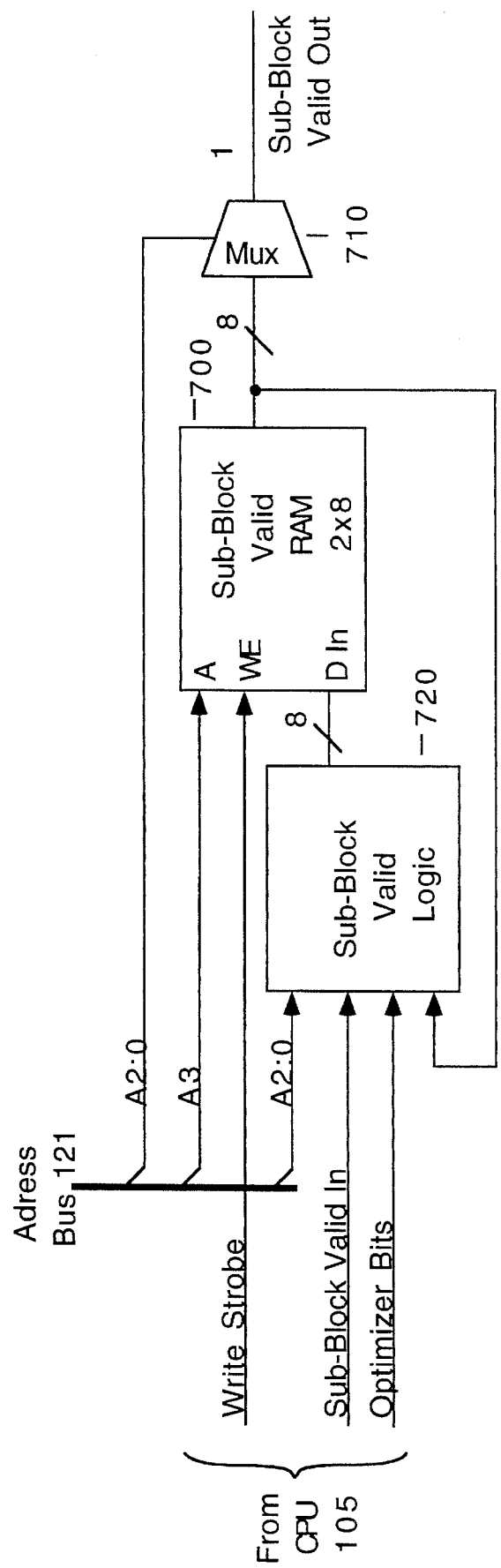
FIG. 8 is a block diagram illustrating an example of a sub-block valid RAM configuration incorporating the teachings of the present invention.

Referring to FIG. 8, a block diagram illustrating an example of a sub-block valid RAM configuration incorporating the teachings of the present invention is shown. The sub-block valid RAM configuration comprises sub-block valid RAM 700, sub-block valid logic 720 and MUX 710. During a read operation, the word select component of the address (A3) selects, for the present example, 8 sub-block valid bits for input to MUX 710. Then, the pointer and subblock indexing components of the address (A2:0) provide a select for MUX 710. The output of MUX 710 comprises the sub-block valid bit for use in determining a cache hit.

Figure 9:
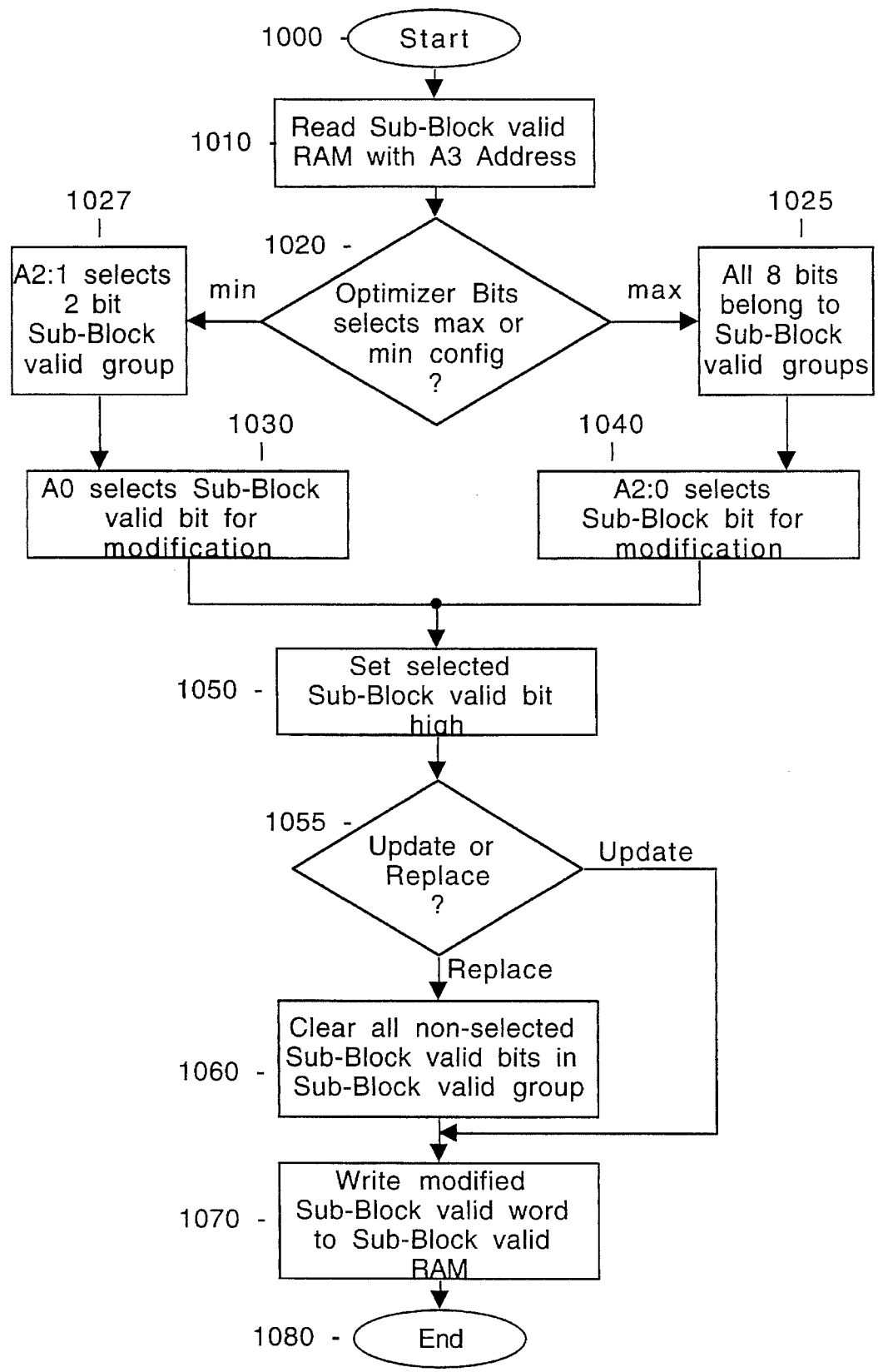
FIG. 9 is a flow diagram illustrating the method of sub-block valid logic incorporating the teachings of the present invention.

Referring to FIG. 9, a flow diagram illustrating the method of sub-block valid logic 720 incorporating the teachings of the present invention is shown. The sub-block valid logic 720 is used in conjunction with a cache replacement or update operation. First, sub-block valid RAM is read with the word select component of the address (A3), and temporarily stored within a buffer in sub-block valid logic 720. The optimizer bits indicate the optimized cache tag structure. For the present example, a Max CAS or Min CAS configurations are selectable. If the Max CAS is indicated, then the pointer and sub-block index components of the address (A2:0) are used to select one bit of the 8 bit sub-block valid group stored in the buffer for modification. If the Min CAS is indicated, address (A2:1) is treated as a word select component and select a 2 bit sub-block valid group. The sub-block index component of the address (A0) selects the sub-block valid bit for modification. The selected sub-block valid bit is set to indicate the sub-block is valid. If the operation is a replacement operation such that a new block is replaced with the existing block, then all other sub-block valid bits in the group are set to indicate corresponding invalid sub-blocks. Alternatively, if the operation is an update operation such that a new subblock is added to the existing block, then all other sub-blocks remain unmodified. The modified sub-block valid word is written to sub-block valid RAM 700 via the word select component of the address.

Figure 10:
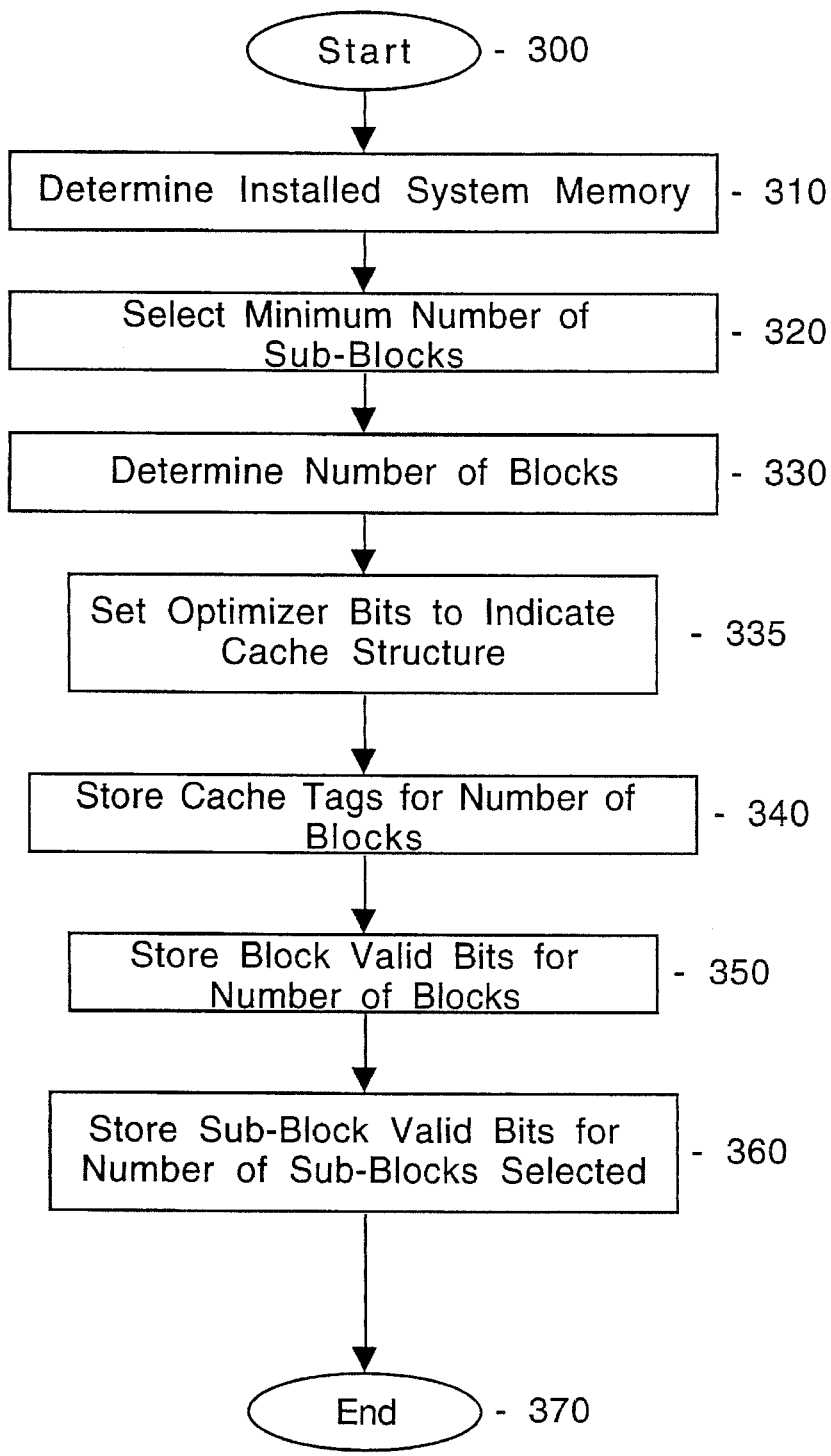
FIG. 10 is a flow diagram illustrating a method for the computer system of the present invention incorporating the method of optimizing a cache tag structure.

Referring to FIG. 10, a flow diagram of the method for the computer system of the present invention incorporating the method of optimizing a cache tag structure is illustrated. In block 310, upon power-up of the computer system, the amount of currently installed memory is determined. A minimum number of sub-blocks are selected based on the amount of memory installed in accordance with the optimization method of the present invention. Based on the number of sub-blocks selected, the number of blocks for the installed memory is determined. Then, the optimizer bits are set to indicate the cache tag structure. Accordingly, the address tags, block valid bits and sub-block valid bits are stored for the optimized cache structure.

The foregoing description of the invention has been presented for the purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

I claim:

1. In a computer system comprising a central processing unit (CPU) coupled to a main memory and a cache memory, a method for optimizing a cache tag structure dependent upon a size of said main memory in said computer system comprising the steps of:

accessing said main memory to determine said size of said main memory, said main memory having a maximum size and a minimum size, said main memory having a plurality of addresses for accessing main memory locations;

selecting a minimum number of sub-blocks for caching said main memory in said cache memory based on said size of said main memory, said minimum number of sub-blocks ranging between two and a maximum number of sub-blocks required to cache said maximum size of said main memory, said minimum number of sub-blocks being a power of two;

determining a number of blocks for caching said main memory based on said minimum number of sub-blocks selected;

storing a plurality of cache tags such that each cache tag in said plurality of cache tags identifies one of said number of blocks;

storing a plurality of block valid bits such that each block valid bit in said plurality of said block valid bits indicates whether a corresponding block is valid; and storing a plurality of sub-block valid bits such that each sub-block valid bit in said plurality of sub-block valid bits indicates whether a corresponding sub-block is valid.

2. (Amended) The method for optimizing a cache tag structure as claimed in claim 1 wherein the step of selecting a minimum number of subblocks comprises the steps of:

calculating a number of bits required for each of a plurality of address tags by dividing said size of said main memory by a size of said cache memory to obtain a quotient and performing a base two logarithm function on said quotient;

calculating a number of address tags required for said minimum number of sub-blocks selected by dividing said size of said cache memory by said minimum number of sub-blocks selected;

calculating a total number of bits required to store said address tags by multiplying said number of bits required for each address tag by said number of address tags required;

determining whether said minimum number of sub-blocks selected is valid by comparing said maximum size of said main memory to a product comprising two raised to the power of said total number of bits required to store said address tags and said size of said cache memory; and increasing said number of sub-blocks selected when said size of said main memory is less than or equal to said product.

3. The method for optimizing a cache tag structure as claimed in claim 1 wherein the step of determining a number of blocks for caching said main memory comprises the step of dividing a size of said cache memory by said number of sub-blocks selected.

4. The method for optimizing a cache tag structure as claimed in claim 1 wherein the step of storing a plurality of cache tags comprises the steps of:

storing each cache tag in a cache tag word when said size of said main memory is equivalent to said maximum size of said main memory; and storing a plurality of cache tags in said cache tag word when said number of sub-blocks selected is less than said maximum number of subblocks required to cache said main memory when said size of said main memory is equivalent to said maximum size of said main memory.

5. The method for optimizing a cache tag structure as claimed in claim 1 wherein the step of storing a plurality of block valid bits comprises the steps of:

selecting said minimum size of said main memory in said computer system;

selecting a number of sub-blocks for caching said minimum amount of memory in said cache memory, said number of sub-blocks ranging between two and a maximum number of said sub-blocks, said number of sub-blocks being a power of two:

determining a number of blocks for caching said minimum amount of memory based on said number of sub-blocks selected; and storing said block valid bit for each of said number of blocks.

6. The method for optimizing a cache tag structure as claimed in claim 1 wherein the step of storing a plurality of sub-block valid bits comprises the steps of:

selecting a number of sub-blocks required for caching said maximum size of said main memory in said cache memory;

determining a number of blocks for caching said maximum size of said main memory based on said number of sub-blocks selected; and storing said sub-blocks in an arrangement so as to cache said maximum size of said main memory.

7. The method for optimizing a cache tag structure as claimed in claim 1 further comprising the step of determining whether a data entry stored in said main memory is stored in said cache memory.

8. The method for optimizing a cache tag structure as claimed in claim 7 wherein the step of determining whether a data entry stored in said main memory is stored in said cache memory comprises the steps of:

accessing a cache tag word with a word select component of said address for accessing main memory;

providing a comparison component for each of said address so as to identify a range of sub-blocks corresponding to said cache tag, said cache tag corresponding to said address;

comparing a first comparison component of said plurality of comparison components with said cache tag word to indicate a match, said first comparison component identifying said cache range for said Max CAS configuration;

selecting a plurality of cache tags within said cache tag word via a pointer component of said address;

comparing said plurality of cache tags with said plurality of comparison components of said address matching each of said plurality of cache tags with a corresponding comparison component to indicate a match; and selecting a cache tag and corresponding comparison component match based on said optimizer indication.

9. The method for optimizing a cache tag structure as claimed in claim 7 wherein the step of determining whether a data entry stored in said main memory is stored in said cache memory comprises the steps of:

selecting one of said plurality of block valid data bits via said word select component and an address tag pointer of said address when less than said size of main memory is less than said maximum size of said main memory; and selecting one of said plurality of block valid data via only a word select component of said address such that said address tag pointer component of said address is set to zero when said size of memory is equal to said maximum size of said main memory.

10. The method for optimizing a cache tag structure as claimed in claim 7 wherein the step of determining whether a data entry stored in said main memory is stored in said cache memory comprises the steps of:

selecting one of a plurality of sub-block valid words via a word select component of said address; and selecting one of said plurality of sub-block valid data bits from said subblock valid word selected via an address tag pointer and a subblock index pointer.

11. The method for optimizing a cache tag structure as claimed in claim 7 wherein the step of determining whether a data entry stored in said main memory is stored in said cache memory comprises the steps of:

indicating a cache hit when said cache tag and corresponding comparison component selected indicates a match, a block valid data selected indicates a corresponding block is valid and said sub-block valid data bit selected indicates a corresponding sub-block is valid; and indicating a cache miss when said cache tag and corresponding comparison component selected does not indicate a match, or said block valid data selected indicates said corresponding block is not valid or said sub-block valid data bit selected indicates said corresponding sub-block is not valid.

12. The method for optimizing a cache tag structure as claimed in claim 1 further comprising the step of modifying said cache structure so as to indicate a new data entry is stored in said cache memory.

13. The method for optimizing a cache tag structure as claimed in claim 12 wherein the step of modifying said cache structure so as to indicate a new data entry is stored in said cache memory comprises the steps of:

retrieving an address tag word via a word select component of said address;

modifying said address tag word selected so as to replace a comparison component of said address when said size of main memory is equal to said maximum size of said main memory;

selecting an address tag from said address tag word retrieved via an address tag pointer component of said address when said size of said main memory is less than said maximum size of main memory;

modifying said address tag selected so as to replace said address tag with said comparison component of said address when said amount of said main memory is less than said maximum size of said main memory; and storing said address tag word modified via said word select component of said address so as to generate a new address tag word.

14. The method for optimizing a cache tag structure as claimed in claim 12 wherein the step of modifying said cache structure so as to indicate a new data entry is stored in said cache memory further comprises the steps of:

selecting a block valid bit via a word select component and said address tag pointer of said address when less than said size of said main memory is equal to said maximum size of said main memory;

selecting a block valid bit via only said word select component of said address when said size of said main memory is equal to said maximum size of said main memory; and set block valid bit to indicate said block is valid.

15. The method for optimizing a cache tag structure as claimed in claim 12 wherein the step of modifying said cache structure so as to indicate a new data entry is stored in said cache memory comprises the steps of:

retrieving an address tag word via a word select component of said address;

selecting a sub-block valid bit via said sub-block valid index component of said address when less than said size of said main memory is equal to said maximum size of said main memory;

selecting a sub-block valid bit via a sub-block valid index and a pointer components of said address for accessing main memory when said maximum amount of memory is installed;

setting said sub-block valid bit so as to indicate said sub-block is valid;

setting all non-selected sub-block valid bits in a sub-block valid word selected to indicate said non-selected sub-blocks are not valid; and storing said sub-block valid word via said word select component of said address.

16. In a computer system comprising a central processing unit (CPU) coupled to a main memory and a cache memory, an apparatus for optimizing a cache tag structure dependent upon a size of said main memory in said computer system, said apparatus comprising:

addressing means for accessing said main memory to determine said amount of said main memory installed in said computer system;

selection means coupled to said addressing means for selecting a minimum number of sub-blocks for caching said main memory in said cache memory depending on said size of said main memory, said cache memory size between two subblocks and a maximum number of sub-blocks required to cache a maximum main memory size with said cache memory, said cache size being a power of two, said selection means determining a number of blocks for caching said main memory based on said minimum number of sub-blocks selected;

cache tag storage means coupled to said selection means for storing a plurality of cache tags such that each of said plurality of cache tags identifies one of said number of blocks;

block valid storage means coupled to said selection means for storing a plurality of block valid bits such that each of said plurality of block valid bits indicates whether a corresponding block is valid; and sub-block valid storage means coupled to said selection means for storing a plurality of sub-block valid bits such that each of said plurality of sub-block valid bits indicates whether a corresponding sub-block is valid.

17. The apparatus for optimizing a cache tag structure as claimed in claim 16 wherein said selection means comprises:

calculation means for calculating a number of bits required for each address tag by dividing said size of said main memory by a size of said cache memory to obtain a quotient and performing a base two logarithm function on said quotient, said calculation means calculating a number of address tags required for said number of sub-blocks selected by dividing said size of said cache memory by said number of sub-blocks selected and calculating a total number of bits required to store said address tags by multiplying said number of bits required for each address tag by said number of address tags required;

comparison means coupled to said calculation means for determining whether said minimum number of sub-blocks selected is valid by comparing said maximum size of said main memory size to a product comprising two raised to the power of said total number of bits and said size Of said cache memory; and incremental means coupled to said comparison means for increasing said number of sub-blocks selected when said size of said main memory is less than or equal to said product.

18. The apparatus for optimizing a cache tag structure as claimed in claim 16 wherein said cache tag storage means comprises:

cache tag word means for storing each cache tag in a cache tag word when said size of said main memory is equal to said maximum size of said main memory and for storing said plurality of cache tags in said cache tag word when said number of sub-blocks selected is less than said maximum number of sub-blocks required to cache said maximum size of said main memory.

19. The apparatus for optimizing a cache tag structure as claimed in claim 16 wherein said block valid storage means comprises:

means for selecting a minimum size of said main memory in said computer system;

selection means for selecting a number of sub-blocks for caching said minimum size of said main memory in said cache memory ranging between two sub-blocks and determining a number of blocks for caching said minimum size of said main memory based on said number of sub-blocks selected; and size means for storing said block valid bits so as to cache said number of blocks for said minimum amount of memory.

* * * * *

UNITED STATES PATENT AND TRADEMARK OFFICE
CERTIFICATE OF CORRECTION

PATENT NO.    : 5,539,894
DATED         : July 23, 1996
INVENTOR(S)   : Webber

Page 1 of 1

It is certified that error appears in the above-identified patent and that said Letters Patent is hereby corrected as shown below:

Title page,
Item [57], line one, please delete "sector".

Column 17,
Line 30, please delete "Of" and insert -- of --.

Signed and Sealed this

Fifth Day of March, 2002

Attest:

JAMES E. ROGAN
Attesting Officer      Director of the United States Patent and Trademark Office